(12) United States Patent
Gaudl

(10) Patent No.: US 10,407,587 B2
(45) Date of Patent: Sep. 10, 2019

(54) POLYSTYRENE VARNISHES, PRINTING INKS, COATINGS AND OVERPRINTS

(71) Applicant: SUN CHEMICAL CORPORATION, Parsippany, NJ (US)

(72) Inventor: Kai-Uwe Gaudl, Bavaria (DE)

(73) Assignee: Sun Chemical Corporation, Parisppany, NJ (US)

( * ) Notice: Subject to any disclaimer, the term of this patent is extended or adjusted under 35 U.S.C. 154(b) by 0 days.

(21) Appl. No.: 15/764,432

(22) PCT Filed: Sep. 27, 2016

(86) PCT No.: PCT/US2016/053946
§ 371 (c)(1),
(2) Date: Mar. 29, 2018

(87) PCT Pub. No.: WO2017/062228
PCT Pub. Date: Apr. 13, 2017

(65) Prior Publication Data
US 2018/0282569 A1    Oct. 4, 2018

Related U.S. Application Data

(60) Provisional application No. 62/238,258, filed on Oct. 7, 2015.

(51) Int. Cl.
*C09D 125/06* (2006.01)
*C09D 4/00* (2006.01)
(Continued)

(52) U.S. Cl.
CPC ............ *C09D 125/06* (2013.01); *B05D 3/06* (2013.01); *B05D 3/108* (2013.01); *B05D 7/26* (2013.01); *C08K 5/10* (2013.01); *C08L 33/04* (2013.01); *C08L 33/08* (2013.01); *C09D 4/00* (2013.01); *C09D 11/033* (2013.01); *C09D 11/037* (2013.01); *C09D 11/06* (2013.01);
(Continued)

(58) Field of Classification Search
CPC ... C09D 11/037; C09D 11/108; C09D 11/106; C09D 4/00; C09D 125/06; C09D 133/04; C09D 133/08; C09D 11/033; C09D 11/06; C08K 5/10; C08L 33/04; C08L 33/08; B05D 3/06; B05D 3/108; B05D 7/26
USPC ....................................................... 524/314
See application file for complete search history.

(56) References Cited

U.S. PATENT DOCUMENTS 5,965,633 A    10/1999  Revol
8,129,459 B2 *  3/2012  Tao .................... C04B 28/02
                                                524/313

OTHER PUBLICATIONS

Islam, MR., "Development of vegetable-oil-based polymers." Journal of Applied Polymer Science, vol. 131, No. 18. Sep. 15, 2014.
(Continued)

*Primary Examiner* — William K Cheung
(74) *Attorney, Agent, or Firm* — Charles C. Achkar; Ostrolenk Faber LLP.

(57) ABSTRACT

The present invention provides technical varnishes comprising polystyrene, especially recycled polystyrene, and biofuels such as fatty acid alkyl esters and/or aliphatic softeners such cyclohexane-dialkyl esters. The technical varnishes are useful, for example, in conjunction with printing inks, especially lithographic inks, and coatings and protective lacquers, and overprint varnishes for sheet-fed inks.

18 Claims, 3 Drawing Sheets

(51) Int. Cl.
*C09D 133/04* (2006.01)
*C09D 133/08* (2006.01)
*C08L 33/04* (2006.01)
*C08L 33/08* (2006.01)
*C09D 11/037* (2014.01)
*C09D 11/06* (2006.01)
*C09D 11/106* (2014.01)
*C08K 5/10* (2006.01)
*B05D 3/06* (2006.01)
*B05D 7/26* (2006.01)
*C09D 11/033* (2014.01)
*C09D 11/108* (2014.01)
*B05D 3/10* (2006.01)

(52) U.S. Cl.
CPC .......... *C09D 11/106* (2013.01); *C09D 11/108* (2013.01); *C09D 133/04* (2013.01); *C09D 133/08* (2013.01)

(56) References Cited

OTHER PUBLICATIONS

International Preliminary Report on Patentability issued in International Application No. PCT/US2016/053946, dated Apr. 10, 2018.

* cited by examiner

POLYSTYRENE VARNISHES, PRINTING INKS, COATINGS AND OVERPRINTS

CROSS REFERENCE TO RELATED APPLICATIONS

The present application is a § 371 National Phase application based on PCT/US2016/053946 filed Sep. 27, 2016, which claims the benefit of U.S. Provisional Application No. 62/238,258, filed Oct. 7, 2015 the subject matter of each of which is incorporated by reference in their entirety.

FIELD OF THE INVENTION

The present invention relates to technical varnishes containing polystyrene, especially recycled polystyrene. The use of biofuels, such as fatty acid alkyl esters, and/or aliphatic softeners, such as cyclohexane-dialkyl esters is described. The technical varnishes are useful in conjunction with printing inks, especially lithographic inks, and coatings and protective lacquers, and overprint varnishes for sheet-fed inks.

BACKGROUND

In the last decades, the search for recyclable feed-stocks has increased considerably as crude oil based products are expected to become more limited in the future. One of these promising feed-stocks is polystyrene. Due to its widespread availability, especially as recycled or reclaimed material, polystyrene has become more and more attractive for industries which require large quantities, such as coatings and inks industries.

From the viewpoint of environmental protection and conservation of resources, it is desirable to use recycled materials as much as possible. However, currently, only a portion of polystyrene waste is recycled, and it would be advantageous to use more of recycled polystyrene in new products.

The high molecular weight of polystyrene and absence of residual monomer content, without any risk of monomer migration, and its outstanding organoleptic properties, makes polystyrene an ideal resin for packaging. Polystyrene is particularly well-suited to food packaging.

However, the use of polystyrene in a dissolved, applicable form in, for example, overprint varnishes for packaging goods or inks, is difficult, as many solvents which dissolve polystyrene are hazardous, highly flammable, volatile organic compounds. For example, toluene, xylene, acetone, methyl ethylketone, and ethyl acetate are often used to dissolve polystyrene. These solvents are difficult to handle in print shops, and difficult to use, especially for food packaging.

For example, E. Flick describes toluene based polystyrene varnishes for coatings applied by gravure cylinders ("Printing ink formulations", ISBN 0-8155-1014-4, page 64). For paintings, varnishes in turpentine are proposed in UA 82856 and LT3623. Turpentine and limonene, which are described in the literature to be able to dissolve polystyrene, are less suitable due to a low flash point and strong odor.

Polystyrene paints in xylene are described in RU2293096 and RU 2472827. A varnish of polystyrene based on xylene and acetone is disclosed in MX2013003779. Tetrahydrofurane as solvent for polystyrene is described in U.S. Pat. No. 5,278,282. U.S. Pat. No. 4,517,312 describes chlorinated solvents such as methylene dichloride as a solvent for polystyrene, which is non-flammable, but highly toxic.

Besides their highly flammable, toxic and odorous character, the aforementioned solvents are moreover not suitable for a lithographic sheet-fed or heat-set printing process. Many substrates for packaging are printed with a sheet-fed ink applied by a lithographic process. This printing process requires a high boiling point solvent, having a boiling point usually >250° C., which may not evaporate during the printing process. U.S. Pat. No. 5,629,352 describes solutions of polystyrene in high-boiling glycol ethers as co-solvents in a process to purify polystyrene, but such polar materials are less suitable for use as solvents in a lithographic process due to the high risk of over-emulsification.

Moreover, polystyrene also has poor or no solubility in solvents typically used in packaging printing inks and varnishes applied by sheet-fed or heat-set printing, such as high boiling mineral oils, such as, for example, 6/9 test oil from Halterman company, and vegetables oils such as, for example, linseed oil, soybean oil, castor oil. In addition, polystyrene exhibits very limited compatibility with typical resins used in graphic arts such as phenolic rosin resins, maleic modified rosin resins, alkyd resins and rosin salts (resinates). This makes it very difficult to introduce polystyrene or preferred recycled polystyrene into graphic arts products, and especially difficult for the lithographic printing process, as there is no suitable solvent. Finally, in WO03/035729, rapeseed methyl ester is mentioned among other solvents as a co-solvent in a process for recycling polystyrene in a dissolving and precipitating procedure. However, use of rapeseed methyl ester may introduce limitations in formulation scope and viscosity range for printing processes.

Thus, there is still a need for varnishes containing polystyrene, where the solvents used to dissolve the polystyrene are more suitable for various printing processes. A need exists to find ways to utilize recycled polystyrene, thereby reducing environmental impact.

BRIEF SUMMARY OF THE INVENTION

The present invention relates to technical varnishes containing polystyrene, especially recycled polystyrene; and biofuels such as fatty acid alkyl esters and/or aliphatic softeners such as cyclohexane-dialkyl esters. The technical varnishes are, for example, useful in conjunction with printing inks, especially lithographic inks, and coatings and protective lacquers, and overprint varnishes for sheet-fed inks.

In a particular aspect, the present invention provides a technical varnish comprising:
   a) 2 wt % to 50 wt % polystyrene; and
   b) 25 wt % to 65 wt % one or more solvents selected from the group consisting of saturated or unsaturated $C_8$-$C_{24}$ fatty acid methyl esters, saturated or unsaturated $C_8$-$C_{24}$ fatty acid ethyl esters, and cyclohexane-dialkyl esters wherein the alkyl chains are saturated $C_8$-$C_{18}$ alkyl chains.

In another aspect, the present invention provides printing inks, coatings, or overprint varnishes comprising the technical varnishes of the invention.

In a further aspect, the present invention provides a method of printing comprising:
   a) applying the printing ink, coating, or overprint varnish of the invention to a substrate; and
   b) drying by either oxidative or non-oxidative drying, or curing the printing ink, coating or overprint varnish.

In a certain aspect, the present invention provides a printed article comprising the technical varnish of the invention.

In a certain aspect, the present invention provides a printed article comprising a printing ink, coating, or overprint varnish of the invention.

BRIEF DESCRIPTION OF THE DRAWINGS

FIG. 1 shows the effect of concentration of expanded polystyrene (Mw=200,000) in linseed oil methyl ester on the viscosity of the technical varnish.

FIG. 2 shows the effect of shear forces on the viscous and elastic component of a technical varnish (polystyrene in soybean methyl ester at 30 weight %), measured with cone and plate rheometer Physika 300 from Anton-Parr Company.

FIG. 3 depicts the effect of shear rate on the viscosity of the technical varnishes.

DETAILED DESCRIPTION OF THE INVENTION

Figure 1:
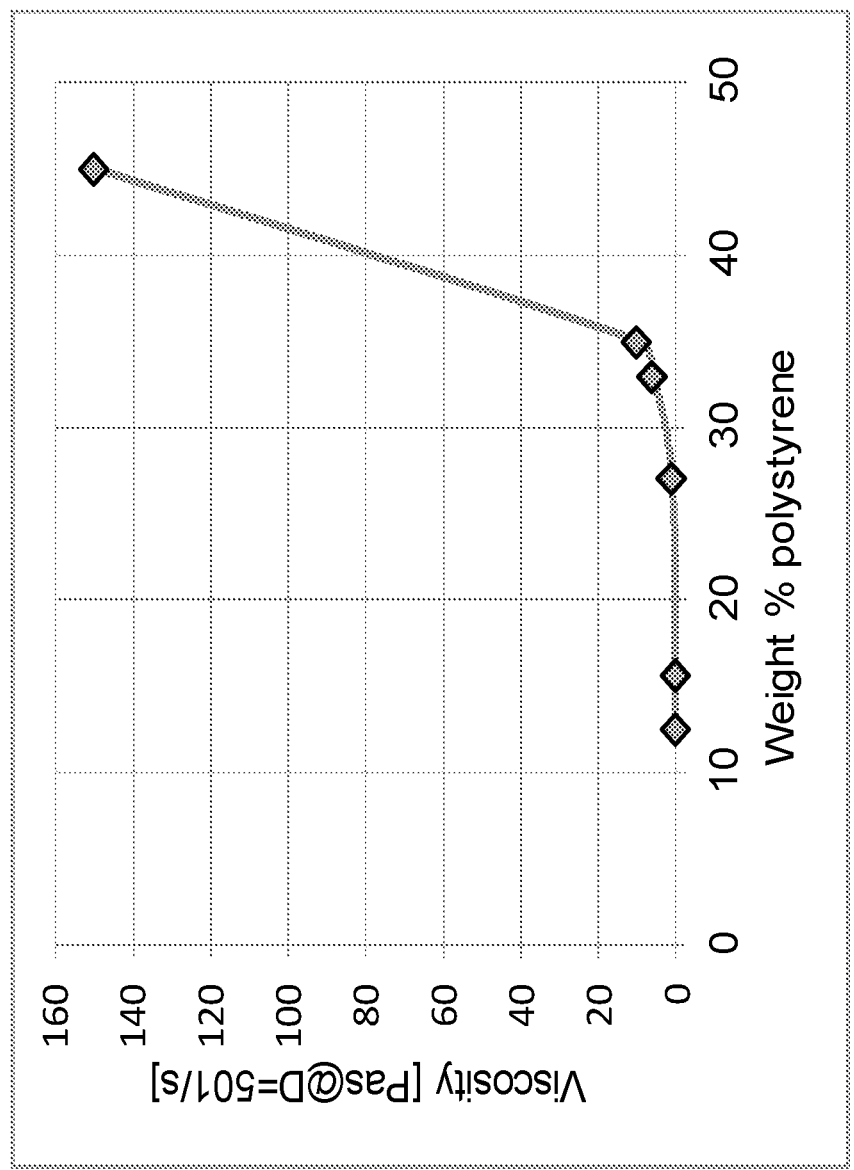
FIG. 1.

The present invention relates to technical varnishes containing polystyrene, especially recycled polystyrene; and biofuels such as fatty acid alkyl esters and/or aliphatic softeners such as cyclohexane-dialkyl esters. The polystyrene would preferably have a weight average molecular weight >10,000. The varnishes are, for example, useful in conjunction with printing inks, especially lithographic inks, and coatings and protective lacquers, and overprint varnishes for sheet-fed inks. The technical varnishes could also be used in letterpress inks, intaglio inks, flexographic inks and gravure inks, as well as in other print or deposition methods.

In a particular aspect, the present invention provides a technical varnish comprising:
a) 2 wt % to 50 wt % polystyrene; and
b) 25 wt % to 65 wt % one or more solvents selected from the group consisting of saturated or unsaturated $C_8$-$C_{24}$ fatty acid methyl esters, saturated or unsaturated $C_8$-$C_{24}$ fatty acid ethyl esters, and cyclohexane-dialkyl esters wherein the alkyl chains are saturated $C_8$-$C_{18}$ alkyl chains.

In another aspect, the present invention provides printing inks, coatings, or overprint varnishes comprising the technical varnishes of the invention.

In a further aspect, the present invention provides a method of printing comprising:
a) applying the printing ink, coating, or overprint varnish of the invention to a substrate; and
b) drying by either oxidative or non-oxidative drying, or curing the printing ink, coating or overprint varnish.

In a certain aspect, the present invention provides a printed article comprising the technical varnish of the invention.

In a certain aspect, the present invention provides a printed article comprising a printing ink, coating, or overprint varnish of the invention.

Definitions

In the present application, the use of the singular includes the plural unless specifically stated otherwise. As used herein, the singular forms "a," "an" and "the" are intended to include the plural forms as well, unless the context clearly indicates otherwise.

In the present application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, the terms "(meth)acrylate" or "(meth)acrylic acid" include both acrylate and methacrylate compounds.

As used herein, the term "article" or "articles" means a substrate or product of manufacture. Examples of articles include, but are not limited to: substrates such as paper, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

As used herein, "technical varnish," "polystyrene varnish," and "polystyrene technical varnish" mean a varnish of polystyrene dissolved in fatty acid alkyl esters or cyclohexane-dialkyl esters. The technical varnishes can be used as a component in inks, coatings, and overprint varnishes.

Throughout this disclosure, all parts and percentages are by weight (wt % or mass % based on the total weight) and all temperatures are in ° C. unless otherwise indicated.

Polystyrene Technical Varnishes, Printing Inks, Coatings, and Overprint Varnishes We found that a technical varnish of polystyrene in rapeseed methyl ester has the potential to be useful in lithographic printing applications due to the boiling point of rapeseed methylester (>250° C.), low toxicity, and due to its ability to dissolve other typical graphic arts raw materials, such as rosin derivatives, hydrocarbon resins and alkyd resins. However, rapeseed methyl ester exhibits a single solution and sole suitable solvent for polystyrene, and introduces limitations in formulation scope and viscosity range. Moreover, due to its large amount of unsaturated fatty acid methyl esters, it cannot be used for low migration inks and coatings and low odor applications, as the unsaturated double bonds are prone to form aldehydes over time and cause an odor.

It has now unexpectedly been found that polystyrene, including recycled polystyrene, exhibits excellent solubility in many common saturated and unsaturated fatty acid methyl and ethyl esters. Fatty acid methyl and ethyl esters belong to the class of biofuels, or, more precisely, represent biodiesels, as they can be used as alternative fuel for diesel engines. This gives a formulator a wide range in formulating products for graphic arts. We observed that technical varnishes that comprise a solution of polystyrene in biodiesels are especially useful as components for protective coatings for paper and cardboard, as well as for overprint varnishes for printing inks.

Among the biofuels, biodiesels are used as a green replacement for gasoil. For example, soybean methyl ester, which is a mixture of different fatty acid methyl esters, is often used. The methyl esters are usually made by the transesterification of the vegetable oils, which contain mainly triglycerides. The vegetable oils are transesterified with methanol or ethanol, giving $C_8$ to $C_{24}$ mono-, di-, or multi-saturated or unsaturated fatty acid methyl and ethyl esters. Examples include, but are not limited to, a methyl or ethyl ester of caprylic acid, capric acid, laurylic acid, myristic acid, palmitic acid, sapienic acid, elaidic acid, vaceneic acid, palmitoleic acid, stearic acid, stearidinic acid, oleic acid, arachidic acid, ricinoleic acid, linoleic acid, linolenic acid, linoelaidic acid, behenic acid, arachidonic acid, eicosapentaenoic acid, erucic acid and lignoceric acid. Alternatively, saturated fatty acid methyl or ethyl esters can be made from fatty acid derived from animal sources, by esterification or transesterification.

We have also discovered that, in food packaging applications, hydrated plasticizers, such as cyclohexyl-dialkyl esters, are especially suitable to dissolve polystyrene. Suitable cyclohexyl-dialkyl esters include, but are not limited to, for example, cyclohexyl-1,2-diethylhexyl ester, cyclohexyl-1,2-dimethyloctyl ester, cyclohexyl-1,2-dinonyl ester. Such materials have been described in the literature as food contact plasticizers and impact modifiers in food packaging, such as for example in PVC plastic wrap films for fresh meat packaging, for aqueous food, and fruits and vegetables, artificial corks, sealing gaskets for beverage containers, flexible tubes for alcoholic and non-alcoholic beverages, conveyor belts for fatty and other foods. Cyclohexyl-dialkyl esters can be made, for example, by catalytic hydration of plasticizers such as phthalates.

The solvents (fatty acid methyl and ethyl esters, and cyclohexyl-dialkyl esters) are typically present in the technical varnishes of the invention in an amount of about 25 wt % to about 65 wt %, based on the total weight of the composition. For example, the solvents may present in an amount of about 25 wt % to about 60 wt %; or about 25 wt % to about 55 wt %; or about 25 wt % to about 50 wt %; or about 25 wt % to about 45 wt %; or about 25 wt % to about 40 wt %; or about 25 wt % to about 35 wt %; or about 25 wt % to about 30 wt %; or about 30 wt % to about 65 wt %; or about 30 wt % to about 60 wt %; or about 30 wt % to about 55 wt %; or about 30 wt % to about 50 wt %; or about 30 wt % to about 45 wt %; or about 30 wt % to about 40 wt %; or about 30 wt % to about 35 wt %; or about 35 wt % to about 65 wt %; or about 35 wt % to about 60 wt %; or about 35 wt % to about 55 wt %; or about 35 wt % to about 50 wt %; or about 35 wt % to about 45 wt %; or about 35 wt % to about 40 wt %; or about 40 wt % to about 65 wt %; or about 40 wt % to about 60 wt %; or about 40 wt % to about 55 wt %; or about 40 wt % to about 50 wt %; or about 40 wt % to about 45 wt %; or about 45 wt % to about 65 wt %; or about 45 wt % to about 60 wt %; or about 45 wt % to about 55 wt %; or about 45 wt % to about 50 wt %.

The polystyrene used for the preparation of the varnishes and coatings of the present invention can be general purpose polystyrene (GPPS) or high impact polystyrene (HIPS). It can be used in a form of compacted or thermally condensed, expanded polystyrene (EPS), extruded polystyrene (XPS), clear, white or colored polystyrene, sheets, scrap or grind, from pre-consumer or post-consumer sources. Molecular weight is not critical, though preferred is polystyrene having a weight average molecular weight >10,000. Higher molecular weight polystyrene, having a molecular weight over 200,000, can be dissolved by the fatty acid methyl or ethyl esters, or cyclohexyl-dialkyl esters of the present invention.

Preferred is clean, compacted polystyrene (EPS) from pre-consumer-food packaging uses, such as food trays, coffee cups and the like, which is not contaminated by dirt, sand, labels, other plastic materials or food.

In order to become compacted polystyrene, collected polystyrene waste material, which is for the most part expanded polystyrene (EPS), usually undergoes an initial compaction process, wherein the material changes density from typically 20-30 $kg/m^3$ to 300-650 $kg/m^3$, so that it becomes more economical to ship and store and to become a recyclable commodity of high value for producers of recycled plastics.

The polystyrene is typically present in a technical varnish of the invention in an amount of about 2 wt % to about 50 wt %, based on the total weight of the composition. For example, the polystyrene can be present in an amount of about 2 wt % to about 45 wt %; or about 2 wt % to about 40 wt %; or about 2 wt % to about 35 wt %; or about 2 wt % to about 30 wt %; or about 2 wt % to about 25 wt %; or about 2 wt % to about 20 wt %; or about 2 wt % to about 15 wt %; or about 2 wt % to about 10 wt %; or about 2 wt % to about 5 wt %; or about 5 wt % to about 50 wt %; or about 5 wt % to about 45 wt %; or about 5 wt % to about 40 wt %; or about 5 wt % to about 35 wt %; or about 5 wt % to about 30 wt %; or about 5 wt % to about 25 wt %; or about 5 wt % to about 20 wt %; or about 5 wt % to about 15 wt %; or about 5 wt % to about 10 wt %; or about 10 wt % to about 50 wt %; or about 10 wt % to about 45 wt %; or about 10 wt % to about 40 wt %; or about 10 wt % to about 35 wt %; or about 10 wt % to about 30 wt %; or about 10 wt % to about 25 wt %; or about 10 wt % to about 20 wt %; or about 10 wt % to about 15 wt %. For example, the polystyrene may be present in an amount of about 35 wt % to about 45 wt %.

For making the technical varnish of the invention, the polystyrene is dissolved in a fatty acid methyl ester, fatty acid ethyl ester, cyclohexyl-dialkyl ester, or a mixture thereof. If the polystyrene comes in compacted bricks or blocks, which can be very large in size, cutting into a suitable size for dissolving is recommended. The solution can be prepared in a heating kettle with a stirrer at elevated temperature, or in a powerful dissolver.

In a typical procedure for a kettle or reactor, the solvents are charged, flushed with nitrogen, and heated to 100° C. to 140° C. under nitrogen. Then polystyrene is added in portions so that stirring is not affected. At the end, the technical varnish is filtered through a brass sieve to separate solid and insoluble impurities, such as insoluble polymers, fillers, colorants, and labels, which are sometimes part of recycled polystyrene, depending on its quality or recycling process.

In a typical procedure for a dissolver, the solvents are charged, then the stirrer, which can be for example a propeller, butterfly stirrer, or dented dissolver disk, is turned on at low speed. Preferred is a dented dissolver disk as it can disrupt larger chunks of polystyrene more easily. Then polystyrene is added in portions. When some polystyrene is dissolved and the viscosity increases, the stirrer speed can be gradually increased as well. Heat, which can be generated during the dissolving process by friction, can additionally help to dissolve polystyrene. At the end, the technical varnish is filtered through a 50 to 150 μm brass sieve to separate solid and insoluble impurities. Usually, a technical varnish made in a dissolver exhibits a lower viscosity and polystyrene content, as the discharge and filtering is done at a lower temperature.

The technical varnishes of polystyrene in biodiesel are preferably clear, colorless to clear brown solutions, depending on the color of the fatty acid methyl or ethyl esters, and can contain 2 wt % to 50 wt % of polystyrene. For better handling for the formulator, a concentration of 35 weight % to 45 weight % of polystyrene in biodiesel is preferred, so that the technical varnishes exhibit a viscosity of, for example, 10 to 100 Pas at room temperature, but are still free flowing and can easily be added to a coating mixture by pouring or handling with an ink knife or the like. Beyond 45 weight % polystyrene, the technical varnishes can become very high in viscosity see (FIG. 1), which impacts handling at room temperature. Though for some applications, a concentration of polystyrene greater than 45 weight % may be suitable.

In such cases where one or more than one of the fatty acid methyl or ethyl esters may be a solid at room temperature, such as palmitic acid methyl ester, a mixture with liquid fatty acid methyl or ethyl esters is suitable. A suitable liquid technical varnish composition can be easily prepared by a person skilled in the art.

Table 1 shows the unique solvency power of the fatty acid methyl esters to dissolve polystyrene.

Highly unexpected is that even a slight change of the structure of the methyl esters, as for example by the change from methyl to isopropyl esters, dramatically reduces the solubility of polystyrene.

TABLE 1

Solubility of 20 weight % expanded polystyrene (EPS, Mw 200,000) in fatty acid alkyl esters

|  | Methyl esters | Isopropyl ester | Ethylhexyl ester |
|---|---|---|---|
| Caprylic acid | soluble | insoluble | insoluble |
| Capric acid | soluble | insoluble | insoluble |
| Laurylic acid | soluble | insoluble | insoluble |
| Myristic acid | soluble | [2]insoluble (Radia 7730) | insoluble |
| Palmitic acid[1] | soluble | insoluble (Radia 7732) | insoluble (Radia 7779) |
| Eliadic acid | soluble | insoluble | insoluble (Radia 7770) |
| Oleic acid | soluble (Radia 7060) | insoluble | insoluble |
| Linoleic acid | soluble | insoluble | insoluble |
| Linolenic acid | soluble | insoluble | insoluble |

[1]Radia is a trade name of Oleon company;
[2]measured at 35° C.

All tested methyl esters were able to dissolve polystyrene, whereas with ethyl esters, the tendency to dissolve polystyrene is reduced considerably and the propyl esters have no potential to dissolve polystyrene at room temperature as shown in Table 1.

For the intended use as a coating material or ink varnish, recycled polystyrene is especially of value as a solution in biofuel, because both ecological and economical targets can be achieved.

The varnishes of the present invention can be used, for example, as overprint varnishes. Overprint varnishes (OPV's) are preferably quick drying varnishes which may, for example, provide a glossy, neutral or matte finish over printed areas.

There are different types of overprint varnishes, such as aqueous types, energy curable overprint varnishes, solvent-based overprint varnishes and oil-based varnishes depending on the requirements for the coating and depending on the deposition and application technology used, and of course depending on the particular finish to be achieved.

With oil-based OPVs, one may, as mentioned above, distinguish varnishes suitable to increase the printing ink brilliance (glossy varnishes), varnishes achieving specific matte effects (matte varnishes and satin-finish varnishes) and protective varnishes which may improve resistance properties (rub resistance, chemical resistance, etc.).

Oil-based OPVs dry by absorption and/or oxidation (oxidative drying), depending on the structure of the paper. Such varnishes may be run in-line or off-line and may be applied by wet offset from a normal lithographic plate and therefore may be applied to specific parts of the printed sheets. Alternatively, they may be applied by dry offset, i.e. with the damping unit being inoperative, to provide full coverage of the sheet. They are used to enhance resistance properties of prints as well as to provide gloss, if desired, or may alternatively provide a matte or semi-matte finish to give a distinctive appearance to a product. As mentioned before, in particular, printed material being the result of a sheet-fed offset printing process, like for example food packaging material, has specific needs, such as low odorous properties. Oil-based OPVs dry by the same mechanism as conventional inks, namely by setting and oxidation. Standard formulations for oil-based resins are, for example, described in "Printing Ink for Lithography" by David J. Owen, 1990, pages 147 to 149.

As an example for an inventive oil-based overprint varnish based on polystyrene and biodiesel, the technical varnishes of the present invention, preferably having a concentration of 35 wt % to 45% polystyrene, are diluted with further fatty acid methyl esters and compatible co-resins (Examples 10 & 11). Co-resins can be used in order to balance coating properties, such as viscosity, rheology, gloss, adhesion, abrasion resistance and the like.

Especially useful are $C_9$ aromatic hydrocarbon resins, which have excellent compatibility with both polystyrene and fatty acid methyl or ethyl esters, as shown in Tables 2 and 3. With the lower molecular weight hydrocarbon resins, the hardness of a polystyrene coating can be adjusted and make it more flexible, which also affects adhesion positively. Such hydrocarbon resins are characterized in that they are often made from feedstock containing a high degree of methyl styrene, vinyl toluene, indene, methyl indene and styrene. Aromatic C9 hydrocarbons are typically present in an amount of about 0.1 wt % to about 25 wt %, based on the total weight of the overprint varnish. For example, aromatic C9 hydrocarbons may be present in an amount of about 0.1 wt % to about 20 wt %; or about 0.1 wt % to about 15 wt %; or about 0.1 wt % to about 10 wt %; or about 0.1 wt % to about 5 wt %; or about 0.1 wt % to about 1 wt %; or about 0.1 wt % to about 0.5 wt %; or about 0.5 wt % to about 25 wt %; or about 0.5 wt % to about 20 wt %; or about 0.5 wt % to about 15 wt %; or about 0.5 wt % to about 10 wt %; or about 0.5 wt % to about 5 wt %; or about 0.5 wt % to about 1 wt %; or about 1 wt % to about 25 wt %; or about 1 wt % to about 20 wt %; or about 1 wt % to about 15 wt %; or about 1 wt % to about 10 wt %; or about 1 wt % to about 5 wt %; or about 5 wt % to about 25 wt %; or about 5 wt % to about 20 wt %; or about 5 wt % to about 15 wt %; or about 5 wt % to about 10 wt %; or about 10 wt % to about 25 wt %; or about 10 wt % to about 20 wt %; or about 10 wt % to about 15 wt %.

TABLE 2

Compatibility of polystyrene and aromatic hydrocarbon resin Norsolene S-145

|  | 1 | 2 | 3 | 4 | 5 |
|---|---|---|---|---|---|
| Polystyrene varnish (20% in linseed methylester) [weight %] | 10 | 25 | 50 | 75 | 90 |
| Hydrocarbon varnish S 145[3] (20% in linseed methylester [weight %] | 90 | 75 | 50 | 25 | 10 |
| Compatibility | yes | yes | yes | yes | yes |

[3]Norsolene S-145, trademark of Cray valley.
Note:
for all examples, compatibility = clear solution at room temperature

TABLE 3

Compatibility of polystyrene and aromatic hydrocarbon resin GA-120

|  | 1 | 2 | 3 | 4 | 5 |
|---|---|---|---|---|---|
| Polystyrene varnish (20% in linseed methylester) [weight %] | 10 | 25 | 50 | 75 | 90 |
| Hydrocarbon varnish GA-120[4] (20% in linseed methylester [weight %] | 90 | 75 | 50 | 25 | 10 |
| Compatibility | yes | yes | yes | yes | yes |

[4]GA-120, aromatic hydrocarbon resin trademark of Luen Liang Industrial, Taiwan Tables 2 and 3 show the good compatibility of polystyrene and $C_9$ aromatic hydrocarbon resins in all mixing ratios. Less suitable are mixed aliphatic/aromatic hydrocarbon resins or pure aliphatic hydrocarbon resin, or hydrocarbon resin based on dicyclopentadiene.

The overprint varnish according to the present invention may optionally still further comprise a siccative (drying agent, such as a manganese salt, e.g. Borchers Dry HS 411 or Borchers Oxy Coat). The siccative can, for example, be present in amounts of from 1.0 weight % to 3.0% by weight, based on the ready to use overprint varnish.

Besides the application via a printing plate, the overprint varnishes can also be applied by the methods known in the art as for example by a blanket roller, by an anilox roller, by a rubber roller, a knife coater or the like, if the coating viscosity is adjusted accordingly by a person skilled in the art by increasing or reducing the amount of fatty acid methyl esters in the coating.

The overprint varnishes may optionally still further comprise about 0.1 wt % to about 5 wt % of a drying alkyd resin or about 0.1 wt % to about 1 wt % of a drying oil, having unsaturated double bonds, which accelerate the oxidative drying. Preferred is China wood oil (tung oil) and fish oil. Moreover, for an oxidative drying overprint varnish of the present invention, a fatty acid methyl ester having a high degree of double bonds, especially conjugated double bonds, is preferred.

The overprint varnishes according to the present invention often contain about 0.1 wt % to about 5 wt % one or more waxes, such as for example, a paraffin wax, polyethylene wax, a jojoba wax, a carnauba wax, a fluorocarbon wax or a silicone wax in order to adjust the slip and improve scratch and abrasion resistance.

The overprint varnishes according to the present invention may optionally still further comprise about 0.1 wt % to about 5 wt % one or more typical additives such as thickeners, leveling agents, de-aerators, de-foamers, wetting agents and the like.

An advantage of the overprint varnishes of the present invention is due to the well-known excellent chemical resistance of polystyrene, the overprint varnishes are highly resistant to hydrolysis and form a more water-repellant, hydrolysis resistant film on a print or painting.

Another advantage of the overprint varnishes of the present invention is that the drying time, or in other words the setting of the coating, can be influenced. This is due to the high molecular weight character of polystyrene. Usually, if the amount of polystyrene in a biofuel based over-print varnish is increased, the setting of the fatty acid methyl esters (drying) is accelerated compared to an overprint varnish which is based on a hydrocarbon resin only. On the other hand, faster drying often leads to a reduction of gloss and a more matte finish.

Moreover, the technical varnishes of the present invention also exhibit a special rheology. At low shear rates, the viscous properties are predominant, but at high shear the elastic properties become more evident. This allows the use of the technical varnishes as a rheology modifier, adjusting elastic and viscous properties.

Figure 2:
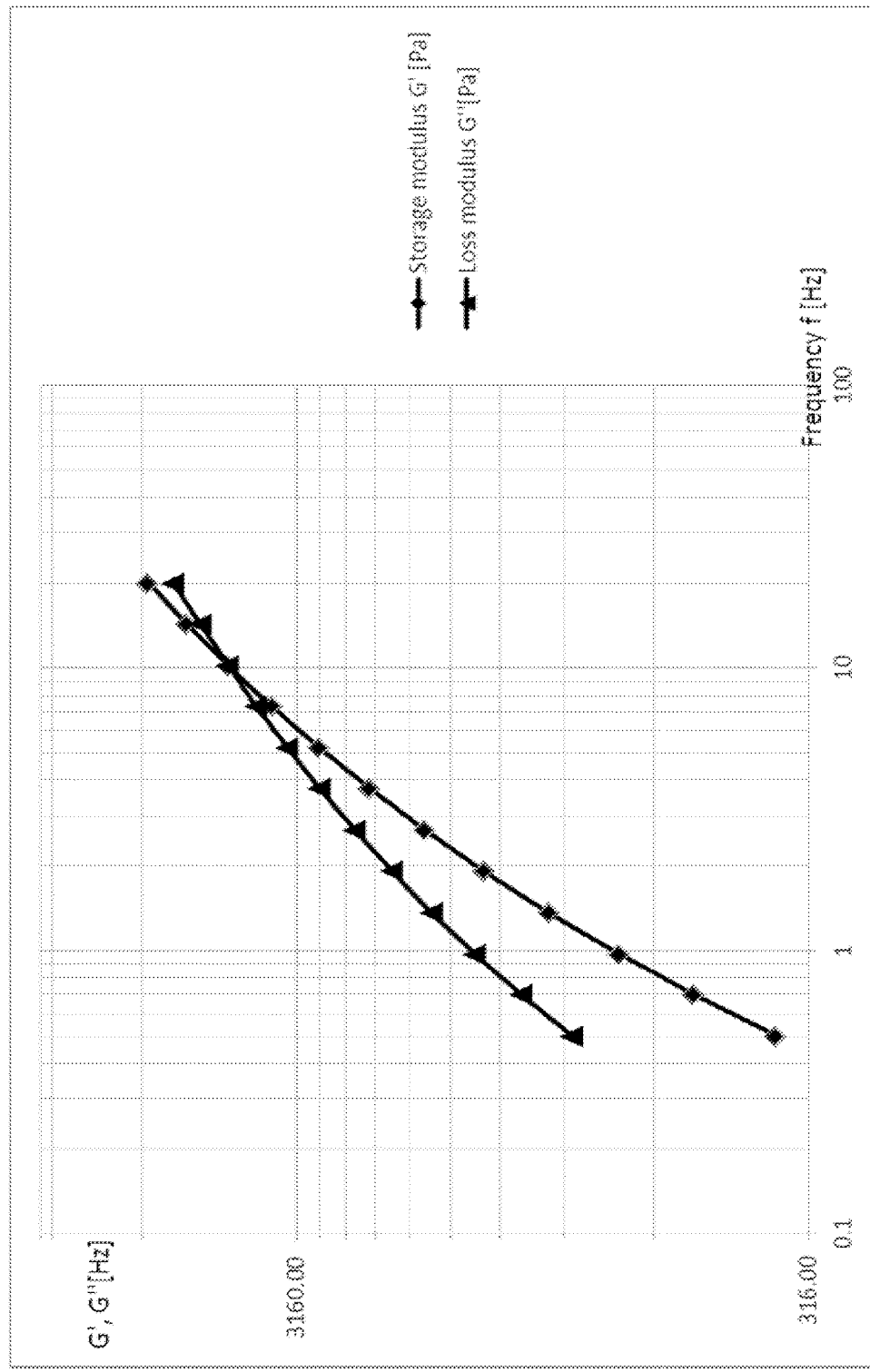
FIG. 2.

FIG. 2 shows that with increasing shear rate (Frequenz f) the storage modulus (squares), which describes the elastic properties of a material becomes more dominant over the loss modulus (triangles), which describes the viscous properties of a material.

Another embodiment of the present invention is as a technical varnish for printing and coating of food packaging. The high molecular weight of polystyrene, and the absence of residual monomers, eliminating the risk of monomer migration, and its outstanding organoleptic properties (odorless and tasteless), make polystyrene an ideal resin for packaging materials, especially for food packaging.

In order to make a technical varnish which is suitable for low migration inks, the solvent should be a food additive and cause no odor by oxidation (aldehyde formation). This requires a saturated fatty acid methyl or ethyl ester, such as for example methyl laureate, mixtures of methyl myristrate or methyl ester of cetylic acid, or fatty acid methyl/ethyl ester with a very low amount of double bonds such as coconut oil methyl esters.

In the course of the investigations with the fatty acid methyl and ethyl esters in food packaging applications, it was discovered that another class of solvents are especially suitable to dissolve polystyrene, hydrated plasticizers such as cyclohexyl-dialkyl ester, as for example cyclohexyl-1,2-diethylhexyl ester, cyclohexyl-1,2-dimethyloctyl ester, cyclohexyl-1,2-dinonyl ester. Such materials have been described in literature as food contact plasticizers and impact modifiers in food packaging, such as for example in PVC plastic wrap films for fresh meat packaging, for aqueous food, and fruits and vegetables, artificial corks, sealing gaskets for beverage containers, flexible tubes for alcoholic and non-alcoholic beverages, conveyor belts for fatty and other foods. Cyclohexyl dialkylesters can be made, for example, by catalytic hydration of plasticizers such as phthalates. The procedure to make the technical varnishes using cyclohexyl-dialkyl esters is as described above.

Figure 3:
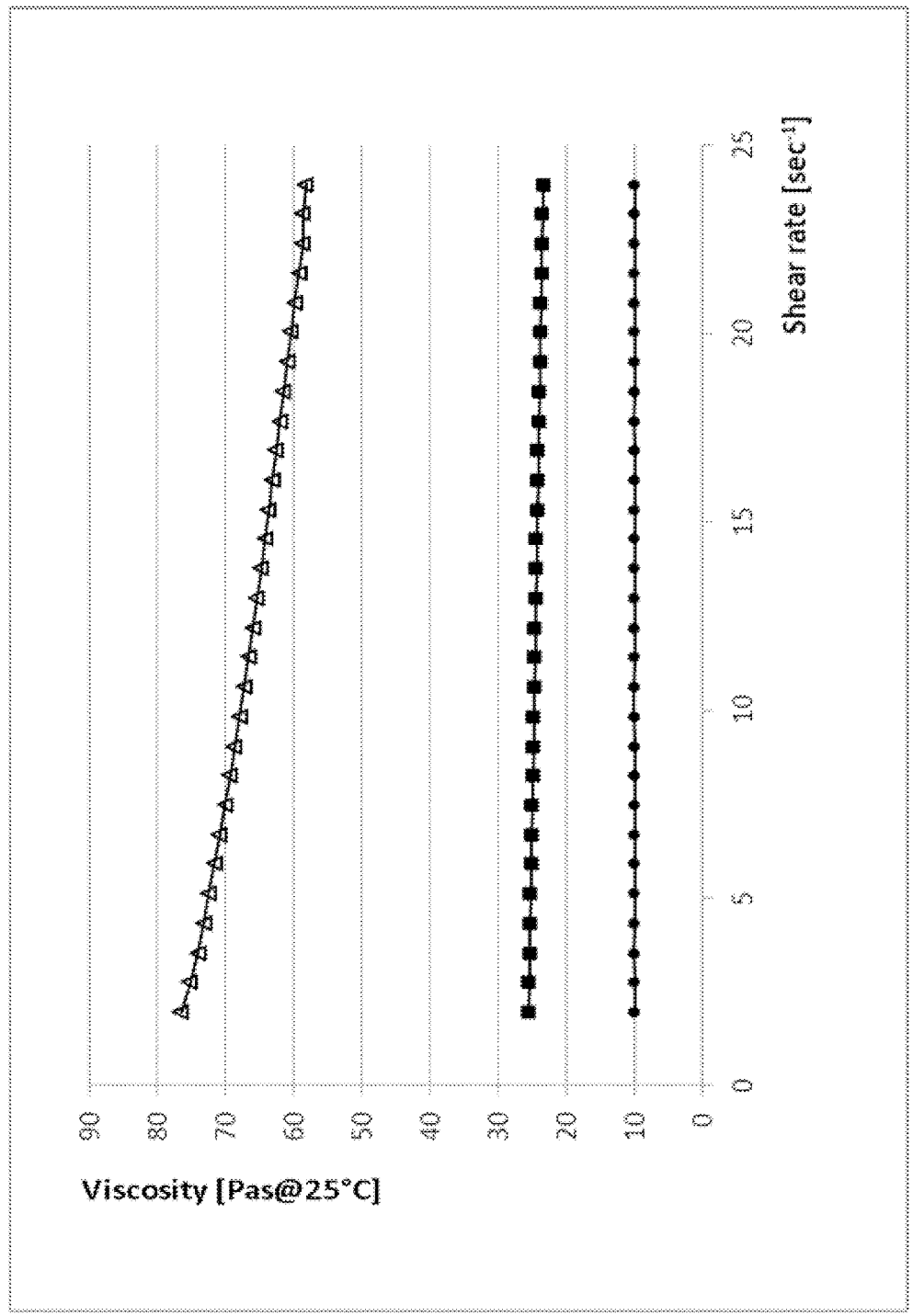
FIG. 3.

FIG. 3 shows the effect of shear rate on the viscosity of technical varnishes of various concentrations of polystyrene (Mw about 200,000) in cyclohexyl-1,2-dinonyl ester (Hexamoll Dinch from BASF). The circles are a 20% solution of polystyrene, the squares are a 23% solution of polystyrene, and the triangles are a 25% solution of polystyrene. At the highest concentration, 25%, the technical varnishes exhibit slight shear thinning characteristics. Due to the higher viscosity of these technical varnishes, they can be further diluted with the fatty acid methyl esters.

The technical varnishes of the invention are suitable for various applications. The simplest application is in protective coatings for paper and cardboard, as well as impregnating varnish for corrugated board. The technical varnishes of the present invention can be used to make overprint varnishes for printed matters. In addition, the technical varnishes of the present invention can also be used to make printing inks, such as lithographic sheetfed inks, heatset inks, and coldset inks. These inks are usually made by adding a colorant into the technical varnishes of the present invention.

Suitable colorants include, but are not limited to organic or inorganic pigments and dyes. The dyes include, but are not limited to, azo dyes, anthraquinone dyes, xanthene dyes, azine dyes, combinations thereof and the like. Organic pigments may be one pigment or a combination of pigments, such as for instance, but not limited to, Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

When present, colorants are typically present in the inks in an amount of about 0.1 wt % to about 50 wt %, based on the total weight of the ink. For example, the colorants may be present in an amount of about 0.1 wt % to about 45 wt %; or about 0.1 wt % to about 40 wt %; or about 0.1 wt % to about 30 wt %; or about 0.1 wt % to about 20 wt %; or about 0.1 wt % to about 10 wt %; or about 0.1 wt % to about 5 wt %; or about 0.1 wt % to about 1 wt %; or about 0.1 wt % to about 0.5 wt %; or about 1 wt % to about 50 wt %; or about 1 wt % to about 40 wt %; or about 1 wt % to about 30 wt %; or about 1 wt % to about 20 wt %; or about 1 wt % to about 10 wt %; or about 1 wt % to about 5 wt %; or about 10 wt % to about 50 wt % or about 10 wt % to about 40 wt %; or about 10 wt % to about 30 wt %; or about 10 wt % to about 20 wt %.

Moreover, the technical varnishes of the present invention can be used as additives to adjust rheology (elasticity) and drying speed of a coating or ink. The technical varnishes of this invention are also suitable components for wood coatings and heat-setting coil coatings.

EXAMPLES

The following examples illustrate specific aspects of the present invention and are not intended to limit the scope thereof in any respect and should not be so construed.

Cone and Plate Viscosity

Cone and plate viscosity was determined using a Physika 300 cone and plate rheometer from Anton Parr GmbH, at a shear rate of D=2 to 100 s$^{-1}$, at 25° C. The viscosity value at a shear rate of D=50 s$^{-1}$ was recorded.

Bubble Viscosity

Byk-Gardner bubble viscometers were used to quickly determine kinematic viscosity. The bubble viscosity is a rough method to measure the viscosity of liquids with a very simple instrument. Exact measurement of viscosity (in mPas) was measured by cone and plate as described above. In the bubble viscosity test, the technical varnishes were filled in test tubes, tempered in a water bath to 25° C., and inverted so that the air bubble moved from the bottom of the test tube to the top. The time required for this movement was monitored, and compared to a calibrated standard. Bubble viscosity units indicate an approximation of the actual viscosity of a liquid.

| | Viscosity [mPas] | | | | | | | | |
|---|---|---|---|---|---|---|---|---|---|
| | ~40 | ~100 | ~200 | ~500 | ~1,000 | ~2,000 | ~5,000 | ~10,000 | ~12,000 |
| Bubble viscosity Gardner (Units) | A | D | H | S | W | Y-Z | Z3 | Z5 | Z6 |

Gardner Color

To measure Gardner color, the technical varnishes, inks, coatings, or overprint varnishes were filled in a test tube of 1 cm×1 cm×10 cm, and irradiated with standardized daylight. The color was compared against a calibrated color test chart until the sample color best matched the test chart color. Colorless=1; dark brown=18.

Gloss

Gloss was measured with a Byk-Gardner micro-gloss instrument at an angle of 60°.

Adhesion

The adhesion of the coatings and overprint varnishes to the ink on a printed film was assessed using the tape test. When the tape adheres more firmly to the coating or overprint varnish than the ink adheres to the coating or overprint varnish, the tape will remove the coating or overprint varnish. For the test, 616 tape from 3M Company was pressed on the coating or overprint varnish and peeled away quickly and cleanly at an angle of 90 degrees to the print. Both the print and the tape were examined. The approximate amount of coating or overprint varnish adhering to the ink was recorded. Excellent=100%; Good>90%; Fail<90%.

Tack

Tack was measured with a calibrated "Tack-o-scope" instrument (Model 2001) from IGT Testing Systems, Netherlands. 1 ml of ink was placed on the EPDM rubber distribution roller at 30° C., distributed for 90 seconds at a roller speed of 50 rpm, then 30 seconds at 300 rpm. The tack value was then taken at a roller speed of 150 rpm.

Ink Grinding Test

Ink particle size was assessed using an ink grinding test. Fineness of an ink grind is an important parameter that describes the quality of dispersion of solid pigment particles in the ink. A grindometer was used to test the fineness of the pigment particles. The grindometer consists of a steel block with a channel of varying depth machined into it, starting at a convenient depth for the type of ink to be measured, and becoming shallower until it ends flush with the block's surface. The depth of the groove is marked off on a graduated scale next to it. The ink to be tested was poured into the deep end of the groove, and scraped towards the shallow end with a flat metal scraper. At the point of 4 μm on the graduated scale, the ink was examined for the number of irregularities. When the rating is zero (0), it means that there are no irregularities greater than 4 μm observed, and the ink is considered to have passed the test.

Rub Resistance

Rub resistance was measured 24 h after printing according to ASTM D 5264 "Standard Practice for Abrasion Resistance of Printed Materials by the Sutherland Rub Tester" with a 910 g load and compared to a standard. Standards are Sun Chemical Sunlith sheetfed inks. Ratings: 5 to 1 (5=excellent, 4=good, 3=average, 2=poor, 1=very poor).

Example 1

Technical Varnish of Recycled Polystyrene in Soybean Methyl Ester

A 2000 cc, four-necked flask, equipped with a propeller stirrer, thermometer, nitrogen gas inlet tube, and reflux condenser, was charged with 1000 g of soybean methyl ester (Soygold 1000 from AGP Company). Nitrogen sparge (3 bubbles per second) was turned on, and the methyl ester was heated under stirring to 120° C. Then, 665 g of recycled polystyrene (EPS; recycled compacted polystyrene derived from food packaging containers, density 0.38 tons/m$^3$, from ACEPE Company, Portugal) was added in small portions over 30 minutes and dissolved. The technical varnish was drained hot at 100° C. through a 100 μm brass sieve.

Viscosity: 65.0 Pa·s (25° C.) at a shear rate of 50 s$^{-1}$ (cone and plate)
Color: 8 Gardner Example 2

Technical Varnish of Recycled Polystyrene in Linseed Methyl Ester

A 2000 cc, four-necked flask, equipped with a propeller stirrer, thermometer, nitrogen inlet tube, and reflux condenser, was charged with 1000 g of linseed methyl ester (Sunpol 7100, from Sunpol Company). Nitrogen sparge (3 bubbles per second) was turned on and the methyl ester was heated under stirring to 120° C. Then, 665 g of recycled compacted polystyrene was added in portions and dissolved. The technical varnish was drained hot through a 100 μm brass sieve.

Viscosity: 68.0 Pa·s (25° C.) at a shear rate of 50 s$^{-1}$ (cone and plate)
Color: 4-5 Gardner Example 3

Technical Varnish of Recycled Polystyrene in Methyl Laurate

A 250 cc, four-necked flask, equipped with a propeller stirrer, thermometer, nitrogen inlet tube, and reflux condenser, was charged with 100.0 g of methyl laurate (Radia 7118, from Oleon Company). Nitrogen sparge (3 bubbles per second) was turned on and the oil was heated under stirring to 120° C. Then, 66.0 g of food grade GPPS polystyrene (CR 2600, from DIC Corporation) was added in portions and dissolved. The technical varnish was drained hot through a 100 μm brass sieve. A colorless clear varnish was obtained.

Viscosity 35.0 Pa·s (25° C.) at a shear rate of 50 s$^{-1}$ (cone and plate)
Color: 1-2 Gardner Examples 4 to 9

Technical Varnishes of Recycled Polystyrene in Fatty Acid Methyl and Ethyl Esters, and Cyclohexyl-Dialkyl Esters A 250 cc four-necked flask, equipped with a propeller stirrer, thermometer, nitrogen inlet tube, and reflux condenser, was charged with 100.0 g of solvent compositions shown in Table 4. Nitrogen sparge (3 bubbles per second) was turned on and solvents were heated under stirring to 120° C. Then, polystyrene (CR 2600, DIC Corporation) was added in portions and dissolved. The technical varnish was drained hot through a 100 μm brass sieve. Colorless clear varnishes were obtained, having the viscosities indicated in Table 4.

TABLE 4

| | Examples 4 to 9 | | | | | |
|---|---|---|---|---|---|---|
| | Example 4 | Example 5 | Example 6 | Example 7 | Example 8 | Example 9 |
| | Weight % | | | | | |
| Polystyrene | 10 | 10 | 10 | 20 | 30 | 56 |
| Hexamoll DINCH[6] | 90 | 70 | 70 | 60 | 50 | 44 |
| Radia 7118[7] | | | 20 | | | |
| Radia7983[8] | | 20 | | 20 | 20 | |
| Total | 100 | 100 | 100 | 100 | 100 | 100 |
| Bubble viscosity | C | D | E | U | Z3 | Z6 |
| Color [Gardner] | 1 | 1 | 1 | 1 | 1 | 1 |

[6]Cyclohexane dinonyl ester, product of BASF;

[7]Radia 7118 is methyl laurate and a trademark of Oleon company;

[8]Radia 7983 is a mixture of capric and caprylic methyl esters and a trademark of Oleon company.

The results in Table 4 show that technical varnishes having suitable viscosity, and a preferred Gardner color can be obtained by dissolving polystyrene in fatty acid methyl or ethyl esters, or cyclohexyl-dialkyl esters according to the present invention.

Example 10

A Drying-Type Lithographic Overprint Varnish

The polystyrene technical varnish from Example 2 was diluted with additional linseed methyl ester at 50° C., then the hydrocarbon varnish was added and dissolved, followed by the China wood oil, and the dryers, and the wax. The mixture was dispersed by a dissolver disk at 5,000 rpm for 10 minutes. The formulation is shown in Table 5.

TABLE 5

Example 10

| Material | Weight % |
|---|---|
| Polystyrene varnish (~40% PS in linseed methyl ester, Example 2) | 25.0 |
| Linseed methyl ester (Sunpol company) | 27.5 |
| China wood oil (Supreme oils) | 5.0 |
| Hydrocarbon varnish (60% Norsolene S145 in linseed methyl ester) | 38.5 |
| Ceridust 3610 wax (Clariant) | 1.0 |
| Borchers Dry HS 411 (cobalt-free dryer from Borchers) | 1.5 |
| Borchers Oxy Coat 1310 (cobalt free dryer from Borchers) | 1.5 |
| Total | 100.0 |

The Example 10 lithographic overprint varnish had a viscosity of 5.6 Pa·s at a shear rate of 50 $s^{-1}$ at 25° C. (cone and plate). The color value was 5 Gardner.

Example 11

A Non-Drying Lithographic Overprint Varnish

The polystyrene technical varnish from Example 3 was diluted with additional lauryl methyl ester, then Hexamoll DINCH was added and wax was dispersed in by a dissolver disk at 5000 rpm for 10 minutes. The formulation is shown in Table 6.

TABLE 6

Example 11

| Material | Weight % |
|---|---|
| Polystyrene varnish (40% PS in methyl laurate, Example 3) | 60.0 |
| Methyl laureate (Oleon) | 30.0 |
| Cyclohexane dinonylester, Hexamoll DINCH (BASF) | 8.5 |
| Ceridust 3610 wax (Clariant) | 1.5 |
| Total | 100.0 |

The Example 11 lithographic overprint varnish had a viscosity of 4.2 Pa·s at a shear rate of 50 $s^{-1}$ at 25° C. (cone and plate). The color value was 1-2 Gardner.

Example 12

Polystyrene Overprint Varnish Applied Over Conventional Sheet-Fed Ink Printed on a Substrate A conventional cyan sheet-fed lithographic ink (Sunlit Triumph Max™, Sun Chemical) was printed onto LWS paper (170 g/m²) with a Prufbau print proofer, at an optical density of 1.5. The prints were left standing for three hours. The overprint varnishes of Examples 10 and 11 were overcoated over the printed ink using a spiral coater (4 μm wet thickness). As a comparison, a commercial oil-based overprint varnish (Topfinish TPF 99, Sun Chemical) was applied. After three days, the gloss and adhesion were measured. The results are shown in Table 7.

TABLE 7

Gloss and adhesion of overprint varnishes

| | Gloss units over printed area measured after 3 days | Gloss units over non-printed area measured after 3 days | Adhesion Tape-test |
|---|---|---|---|
| Example 10 | 75 | 41 | Passed 100% |
| Example 11 | 87 | 41 | Passed 100% |
| Topfinish TPF 99 (Sun Chemical) | 74 | 41 | Passed 100% |

The results in Table 7 show that a commercially valuable varnish can be achieved with recycled polystyrene, exhibiting high gloss and good adhesion.

Example 13

Lithographic Sheet-Fed Inks Made with Recycled Polystyrene Technical Varnish

Lithographic sheet-fed inks were made by mixing components A to C, and pigments D, E, or F, according to the formulations in Table 8, in a dissolver equipped with a butterfly-trifoil stirrer, at low speed for 30 minutes in order to wet out the pigment. Then, the premix was ground three times on a three roll mill at a pressure of 20 bar, and a temperature of 30° C. Then, the color concentrate was slowly diluted (30 minutes addition time) with a solution of H and F in I, in the dissolver.

TABLE 8

Lithographic sheet-fed inks

| Raw Materials | Component | Cyan (weight %) | Yellow (weight %) | Orange (weight %) |
|---|---|---|---|---|
| Color concentrates | | | | |
| Phenolic rosin resin (MWV) | A | 17.50 | 17.50 | 16.50 |
| Drying alkyd resin (Spolchemie) | B | 13.00 | 13.00 | 12.00 |
| Soybean oil methylester (CAS No. 67784-80-9) | C | 17.00 | 19.00 | 19.00 |
| Pigment blue 15 (Sun Chemical) | D | 15.50 | | |
| Pigment yellow 14 (Sun Chemical) | E | | 13.00 | |
| Pigment orange 13 (Sun Chemical) | F | | | 17.00 |
| Polystyrene let-down varnishes | | | | |
| Linseed oil methylester (CAs No. 70983-82-3) | G | 28.50 | 29.00 | 28.00 |
| Recycled polystyrene (Supplier: Chemical resources, US) | H | 7.00 | 7.00 | 6.00 |
| Oxidative dryer (DIC) | F | 1.50 | 1.50 | 1.50 |
| Total | | 100.00 | 100.00 | 100.00 |

The properties of the inks were tested as described above, and the results are shown in Table 9.

TABLE 9

Properties of lithographic sheet-fed inks

| | Cyan | Yellow | Orange |
|---|---|---|---|
| Ink viscosity [Pa · s] at 50 s−1 | 82.1 | 45.7 | 81.7 |
| Tack, Tack-o-scope [units] at 200 rpm | 260 | 270 | 245 |
| Ink grinding test (particles > 4 μm) | 0 | 0 | 0 |

The inks of Table 8 were printed with a Prufbau print proofer on a paper substrate (Magnostar 115 g/m²), with optical densities of yellow=1.32, orange=1.52, and cyan=1.46. Gloss and rub resistance were measured as described above. The results are shown in Table 10.

TABLE 10

Gloss and rub resistance of lithographic sheet-fed inks

| Laboratory evaluation | Cyan | Yellow | Orange |
|---|---|---|---|
| Gloss (60°) after 24 h [gloss units] | 41 (Standard = 46) | 44 (Standard = 57) | 48 (Standard = 51) |
| Rub resistance after 24 h* | 4 (Standard = 4) | 4 (Standard = 4) | 3 (Standard = 4) |

The results in Tables 9 and 10 show that the technical varnishes of the invention can be used to make lithographic inks with suitable viscosity, with an appropriate tack and particle size. The results also show that the lithographic inks made with the technical varnishes of the present invention exhibit preferred gloss and rub resistance.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A technical varnish comprising:
   a) 2 wt % to 50 wt % polystyrene;
   b) 25 wt % to 65 wt % one or more solvents selected from the group consisting of saturated or unsaturated $C_8$-$C_{24}$ fatty acid methyl esters, saturated or unsaturated $C_8$-$C_{24}$ fatty acid ethyl esters, and cyclohexane-1,2-dialkyl esters wherein the alkyl chains are saturated $C_8$-$C_{18}$ alkyl chains; and
   wherein the one or more cyclohexyl-1,2-dialkyl esters are each independently selected from the group consisting of cyclohexyl-1,2-dibutyl ester, cyclohexyl-1,2-dineopentyl ester, cyclohexyl-1,2-dihexyl ester, cyclohexyl-1,2-diethylhexyl ester, cyclohexyl-1,2-dioctyl ester, cyclohexyl-1,2-dinonyl ester, cyclohexyl-1,2-dimethyloctyl ester, cyclohexyl-1,2-didecyl ester, cyclohexyl-1,2-dilauryl ester, cyclohexyl-1,2-dipalmitic acid ester, and cyclohexyl-1,2-distearic acid ester.

2. The technical varnish of claim 1, wherein the polystyrene has a weight average molecular weight greater than 10,000.

3. The technical varnish of claim 1, wherein the one or more fatty acid methyl esters and fatty acid ethyl esters are derived from vegetable oils or animal fats.

4. The technical varnish of claim 1, wherein the solvents comprise less than 15 wt % of fatty acid methyl esters and fatty acid ethyl esters derived from rapeseed oil.

5. The technical varnish of claim 1, wherein the solvents contain no fatty acid methyl esters and fatty acid ethyl esters derived from rapeseed oil.

6. The technical varnish of claim 1, wherein the one or more fatty acid methyl esters and fatty acid ethyl esters comprise a methyl or ethyl acid of caprylic acid, caproic acid, lauric acid, myristic acid, palmitic acid, sapienic acid, elaidic acid, vaceneic acid, palmitoleic acid, steric acid, oleic acid, arachidic acid, ricinoleic acid, linoleic acid, linolenic acid, linoelaidic acid, behenic acid, arachidonic acid, eicosapentaenoic acid, erucic acid, or lignoceric acid.

7. A printing ink, coating, or overprint varnish comprising the technical varnish of claim 1.

8. The printing ink, coating, or overprint varnish of claim 7, wherein the technical varnish is present in an amount of 2 wt % to 65 wt %.

9. The printing ink, coating, or overprint varnish of claim 7, further comprising one or more of 0.1 wt % to 25 wt % one or more aromatic $C_9$ hydrocarbon resins; 0.1 wt % to 1 wt % tung oil; 0.1 wt % to 5 wt % one or more alkyd resins; 0.1 wt % to 5 wt % vegetable oils; 0.1 wt % to 5 wt % one or more mineral oils; 0.1 wt % to 5 wt % one or more siccative dryers; 0.1 wt % to 5 wt % one or more waxes; or 0.1 wt % to 50 wt % one or more colorants.

10. The printing ink, coating, or overprint varnish of claim 7, which is water-based, oil-based, energy curable, hybrid water-based and energy curable, or hybrid oil-based and energy curable.

11. The printing ink, coating, or overprint varnish of claim 7, which is a lithographic sheetfed, heat set, or cold set ink, coating, or varnish.

12. A method of printing comprising:
a) applying the printing ink, coating, or overprint varnish of claim 7 to a substrate; and
b) drying the printing ink, coating, or overprint varnish by either oxidative or non-oxidative drying, or energy curing.

13. The method of claim 12, wherein the printing process is lithographic sheetfed, heat set, or cold set.

14. The method of claim 12, wherein the substrate is a packaging material.

15. The method of claim 14, wherein the packaging material is a food package.

16. The method of claim 15, wherein the printing ink, coating, or overprint varnish is in contact with the food in the package.

17. A printed article comprising the technical varnish of claim 1.

18. A printed article comprising the printing ink, coating, or overprint varnish of claim 7.

* * * * *